United States Patent
Huang et al.

(10) Patent No.: US 11,526,748 B2
(45) Date of Patent: Dec. 13, 2022

(54) METHOD AND APPARATUS FOR PREDICTING PASSENGER FLOW

(71) Applicant: BEIJING BAIDU NETCOM SCIENCE AND TECHNOLOGY CO., LTD., Beijing (CN)

(72) Inventors: Yaobo Huang, Beijing (CN); Minghao Liu, Beijing (CN); Siyu An, Beijing (CN); Jiangliang Guo, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 792 days.

(21) Appl. No.: 16/455,449

(22) Filed: Jun. 27, 2019

(65) Prior Publication Data
US 2020/0097815 A1  Mar. 26, 2020

(30) Foreign Application Priority Data
Sep. 21, 2018  (CN) .......................... 201811109673.5

(51) Int. Cl.
*G06N 3/08* (2006.01)
*G06K 9/62* (2022.01)

(52) U.S. Cl.
CPC .............. *G06N 3/08* (2013.01); *G06K 9/6232* (2013.01); *G06K 9/6256* (2013.01); *G06K 9/6262* (2013.01)

(58) Field of Classification Search
CPC .............. G06Q 10/04; G06Q 30/0203; G06Q 30/0205; G06K 9/6271; G06K 9/6256; G06N 3/0454
See application file for complete search history.

(56) References Cited

U.S. PATENT DOCUMENTS

| 2017/0255966 A1* | 9/2017 | Khoury .................. G07C 5/008 |
| 2019/0228593 A1* | 7/2019 | Liu ...................... G07B 15/063 |

FOREIGN PATENT DOCUMENTS

CN     108197739 A     6/2018

OTHER PUBLICATIONS

Te et al., "Smart Card Passenger Flow Prediction of Urban Bus Passenger Distribution Point Based on Deep Learning Approach: A case study in Changzhou," vol. 18, No. 2, Apr. 2018, 6 pages.
(Continued)

*Primary Examiner* — Ross Varndell
(74) *Attorney, Agent, or Firm* — Seed IP Law Group LLP

(57) ABSTRACT

Embodiments of the present disclosure disclose a method and apparatus for predicting a passenger flow. A specific implementation of the method includes: acquiring, based on a received prediction request for a passenger flow value of a target traffic route in a preset time period, route information of the target traffic route and a passenger flow sequence corresponding to a preset number of consecutive time periods before a current time; encoding the route information to generate encoded route information; and inputting the encoded route information and the passenger flow sequence into a pre-trained passenger flow prediction model to obtain a passenger flow prediction value of the target traffic route in the preset time period, the passenger flow prediction model being used to represent a corresponding relationship between both the encoded route information and the passenger flow sequence and the passenger flow prediction value of the target traffic route.

9 Claims, 4 Drawing Sheets

(56) References Cited

OTHER PUBLICATIONS

Zong-tao et al., "Taxi Demand Prediction Based on CNN-LSTM-ResNet Hybrid Depth Learning Model," vol. 18, No. 4, Aug. 2018, 9 pages.

* cited by examiner

METHOD AND APPARATUS FOR PREDICTING PASSENGER FLOW

CROSS-REFERENCE TO RELATED APPLICATIONS

This application claims priority to Chinese Application No. 201811109673.5, filed on Sep. 21, 2018 and entitled "Method and Apparatus for Predicting Passenger Flow," the entire disclosure of which is hereby incorporated by reference.

TECHNICAL FIELD

Embodiments of the present disclosure relate to the field of computer technology, specifically to a method and apparatus for predicting a passenger flow.

BACKGROUND

With the development of information technology, the interaction between various platforms facilitates the acquisition of data. Big data-based information technology may be applied in various industries. The various industries analyze acquired historical data through data platforms, thereby realizing the prediction of future information.

In the related technology applied to passenger flow prediction, the acquired historical data is usually analyzed by manual labeling to obtain a passenger flow prediction value. Or, passenger flow information is predicted by manual prediction.

SUMMARY

Embodiments of the present disclosure propose a method and apparatus for predicting a passenger flow.

In a first aspect, the embodiments of the present disclosure provide a method for predicting a passenger flow, including: acquiring, based on a received prediction request for a passenger flow value of a target traffic route in a preset time period, route information of the target traffic route and a passenger flow sequence corresponding to a preset number of consecutive time periods before a current time; encoding the route information to generate encoded route information; and inputting the encoded route information and the passenger flow sequence into a pre-trained passenger flow prediction model to obtain a passenger flow prediction value of the target traffic route in the preset time period, the passenger flow prediction model being used to represent a corresponding relationship between both the encoded route information and the passenger flow sequence and the passenger flow prediction value of the target traffic route.

In some embodiments, the passenger flow prediction model includes a passenger flow prediction sub-model and a long short term memory network, and the inputting the encoded route information and the passenger flow sequence into a pre-trained passenger flow prediction model to obtain a passenger flow prediction value of the target traffic route in the preset time period, includes: inputting the encoded route information into the passenger flow prediction sub-model to obtain a first feature value, where the first feature value is used to represent a prediction result of the passenger flow value of the target traffic route in the preset time period; inputting the passenger flow sequence into the long short term memory network to obtain a second feature value, where the second feature value is used to represent a prediction deviation of the prediction result; and inputting the first feature value and the second feature value into a pre-trained fully connected network to obtain the passenger flow prediction value of the target traffic route in the preset time period.

In some embodiments, the passenger flow prediction sub-model includes a generalized linear model and a deep neural network.

In some embodiments, the passenger flow prediction model is obtained by the following training steps: acquiring a training sample set, where a training sample in the training sample set includes encoded sample route information, a sample passenger flow sequence corresponding to a preset number of consecutive time periods before a specified time period, and a sample passenger flow value of the specified time period; and selecting a training sample from the training sample set, and performing the following adjustment steps: inputting the encoded sample route information in the selected training sample into an initial passenger flow prediction sub-model to obtain a first initial feature value; inputting the sample passenger flow sequence corresponding to the preset number of consecutive time periods before the specified time period in the selected training sample into an initial long short term memory network to obtain a second initial feature value; inputting the obtained first initial feature value and the second initial feature value into the fully connected network to obtain a prediction value of a sample passenger flow of the specified time period; determining whether a loss value of a preset loss function reaches a preset target value based on the preset loss function; and determining, in response to determining that the loss value of the preset loss function reaches the preset target value, the passenger flow prediction model being trained, where the preset loss function is used to indicate a difference between the prediction value of the sample passenger flow of the specified time period and the sample passenger flow value of the specified time period.

In some embodiments, the training steps of the passenger flow prediction model further include: adjusting, in response to determining that the loss value of the preset loss function does not reach the preset target value, parameters of the initial passenger flow prediction sub-model and parameters of the initial long short term memory network, using adjusted initial passenger flow prediction sub-model as the initial passenger flow prediction sub-model, using adjusted initial long short term memory network as the initial long short term memory network, and continuing performing the adjustment steps.

In a second aspect, the embodiments of the present disclosure provide an apparatus for predicting a passenger flow, including: an acquisition unit, configured to acquire, based on a received prediction request for a passenger flow value of a target traffic route in a preset time period, route information of the target traffic route and a passenger flow sequence corresponding to a preset number of consecutive time periods before a current time; an encoding unit, configured to encode the route information to generate encoded route information; and a generation unit, configured to input the encoded route information and the passenger flow sequence into a pre-trained passenger flow prediction model to obtain a passenger flow prediction value of the target traffic route in the preset time period, the passenger flow prediction model being used to represent a corresponding relationship between both the encoded route information and the passenger flow sequence and the passenger flow prediction value of the target traffic route.

In some embodiments, the passenger flow prediction model includes a passenger flow prediction sub-model and a long short term memory network, and the generation unit includes: a first generation subunit, configured to input the encoded route information into the passenger flow prediction sub-model to obtain a first feature value, where the first feature value is used to represent a prediction result of the passenger flow value of the target traffic route in the preset time period; a second generation subunit, configured to input the passenger flow sequence into the long short term memory network to obtain a second feature value, where the second feature value is used to represent a prediction deviation of the prediction result; and a fully connection subunit, configured to input the first feature value and the second feature value into a pre-trained fully connected network to obtain the passenger flow prediction value of the target traffic route in the preset time period.

In some embodiments, the passenger flow prediction sub-model includes a generalized linear model and a deep neural network.

In some embodiments, the passenger flow prediction model is obtained by the following training steps: acquiring a training sample set, where a training sample in the training sample set includes encoded sample route information, a sample passenger flow sequence corresponding to a preset number of consecutive time periods before a specified time period, and a sample passenger flow value of the specified time period; and selecting a training sample from the training sample set, and performing the following adjustment steps: inputting the encoded sample route information in the selected training sample into an initial passenger flow prediction sub-model to obtain a first initial feature value; inputting the sample passenger flow sequence corresponding to the preset number of consecutive time periods before the specified time period in the selected training sample into an initial long short term memory network to obtain a second initial feature value; inputting the obtained first initial feature value and the second initial feature value into the fully connected network to obtain a prediction value of a sample passenger flow of the specified time period; determining whether a loss value of a preset loss function reaches a preset target value based on the preset loss function; and determining, in response to determining that the loss value of the preset loss function reaches the preset target value, the passenger flow prediction model is trained, where the preset loss function is used to indicate a difference between the prediction value of the sample passenger flow of the specified time period and the sample passenger flow value of the specified time period.

In some embodiments, the training steps of the passenger flow prediction model further include: adjusting, in response to determining that the loss value of the preset loss function does not reach the preset target value, parameters of the initial passenger flow prediction sub-model and parameters of the initial long short term memory network, using adjusted initial passenger flow prediction sub-model as the initial passenger flow prediction sub-model, using adjusted initial long short term memory network as the initial long short term memory network, and continuing performing the adjustment steps.

In a third aspect, the embodiments of the present disclosure provide an electronic device, including: one or more processors; a storage apparatus, storing one or more programs thereon; and the one or more programs, when executed by the one or more processors, cause the one or more processors to implement the method according to any one of the embodiments in the methods.

In a fourth aspect, the embodiments of the present disclosure provide a computer readable storage medium, storing a computer program thereon, the program, when executed by a processor, implements the method according to any one of the embodiments in the methods.

The method and apparatus for predicting a passenger flow provided by the embodiments of the present disclosure, acquire route information of a target traffic route and a passenger flow sequence corresponding to a preset number of consecutive time periods before a to-be-predicted time period, then encode the route information to generate encoded route information, and input the encoded route information and the passenger flow sequence into a pre-trained passenger flow prediction model to obtain a passenger flow prediction value of the target traffic route in the preset time period, so that the predicted passenger flow value is more accurate, and the prediction accuracy of the passenger flow value is improved.

BRIEF DESCRIPTION OF THE DRAWINGS

After reading detailed descriptions of non-limiting embodiments with reference to the following accompanying drawings, other features, objectives and advantages of the present disclosure will become more apparent.

DETAILED DESCRIPTION OF EMBODIMENTS

The present disclosure will be further described below in detail in combination with the accompanying drawings and the embodiments. It may be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should be noted that the embodiments in the present disclosure and the features in the embodiments may be combined with each other on a non-conflict basis. The present disclosure will be described below in detail with reference to the accompanying drawings and in combination with the embodiments.

Figure 1:
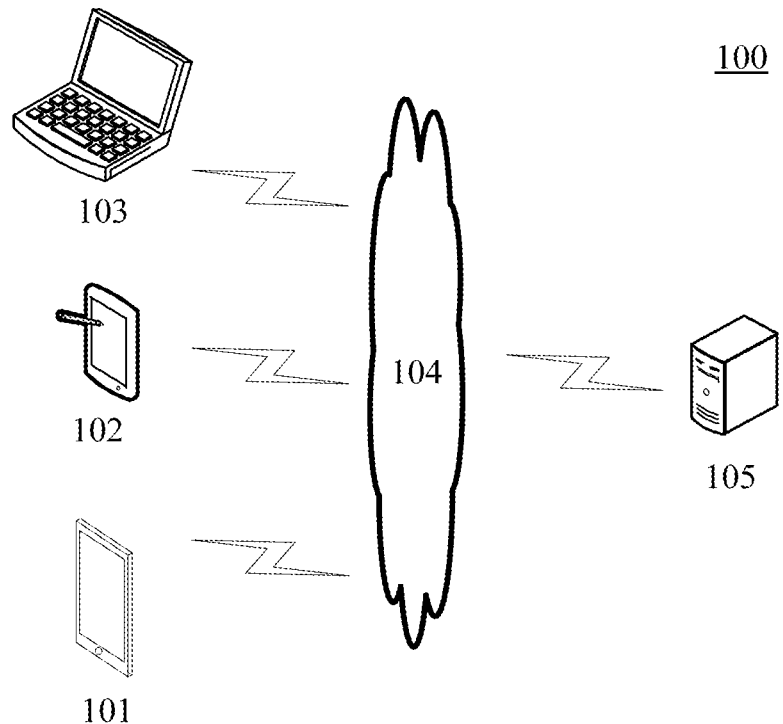
FIG. 1 is a diagram of an exemplary system architecture diagram in which an embodiment of the present disclosure may be implemented.

FIG. 1 illustrates an exemplary system architecture 100 in which an embodiment of a method for predicting a passenger flow or an apparatus for predicting a passenger flow of the present disclosure may be implemented.

As shown in FIG. 1, the system architecture 100 may include terminal devices 101, 102, 103, a network 104, and a server 105. The network 104 serves as a medium providing a communication link between the terminal devices 101, 102, 103 and the server 105. The network 104 may include various types of connections, such as wired or wireless communication links, or optical fibers, or the like.

A user may interact with the server 105 via the network 104 using the terminal devices 101, 102, 103, to receive or transmit messages or the like. Various communication client applications, such as information prediction applications, may be installed on the terminal devices 101, 102, and 103.

The terminal devices 101, 102 and 103 may be hardware or software. When the terminal devices 101, 102 and 103 are hardware, the terminal devices may be various electronic devices having display screens and supporting data input, including but not limited to smart phones, tablets, laptop portable computers, desktop computers, etc. When the terminal devices 101, 102 and 103 are software, the terminal devices may be installed in the above-listed electronic devices. They may be implemented as a plurality of software or software modules, or as a single software or software module, which is not specifically limited here.

The server 105 may be a server that provides various services, such as a passenger flow prediction server that analyzes a passenger flow prediction request including route information transmitted by the terminal devices 101, 102, and 103, and generates a predicted passenger flow value. The passenger flow prediction server may analyze and process the acquired route information of a target traffic route and a passenger flow sequence corresponding to a time period before the current time, and feed back a processing result (for example, a predicted passenger flow value) to the terminal devices.

It should be noted that the method for predicting a passenger flow provided by the embodiments of the present disclosure is generally executed by the server 105. Accordingly, the apparatus for predicting a passenger flow is generally provided in the server 105.

It should be noted that the server 105 may also locally store the route information of the target traffic route and the passenger flow sequence corresponding to the consecutive time periods before the to-be-predicted time period, and the server 105 may directly extract the local route information of the target traffic route and the passenger flow sequence corresponding to the consecutive time periods before the to-be-predicted time period. In this case, the exemplary system architecture 100 may not include the terminal devices 101, 102, 103 and the network 104.

It should be noted that the server 105 may be hardware or software. When the server 105 is hardware, the server may be implemented as a distributed server cluster composed of a plurality of servers, or as a single server. When the server is software, the server may be implemented as a plurality of software or software modules, or as a single software or software module, which is not specifically limited here.

It should be appreciated that the numbers of the terminal devices, the networks and the servers in FIG. 1 are merely illustrative. Any number of terminal devices, networks and servers may be provided based on the implementation requirements.

Figure 2:
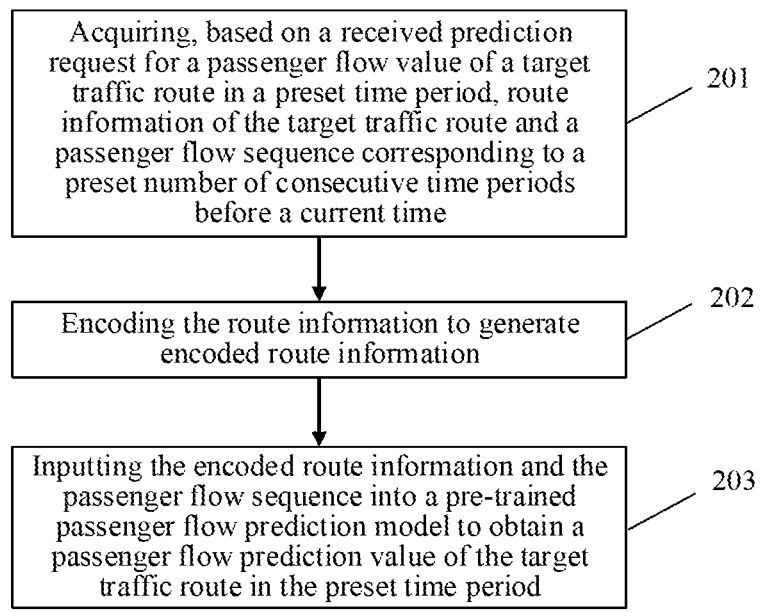
FIG. 2 is a flowchart of an embodiment of a method for predicting a passenger flow according to the present disclosure.

With further reference to FIG. 2, a flow 200 of an embodiment of a method for predicting a passenger flow according to the present disclosure is illustrated. The method for predicting a passenger flow includes the following steps.

Step 201, acquiring, based on a received prediction request for a passenger flow value of a target traffic route in a preset time period, route information of the target traffic route and a passenger flow sequence corresponding to a preset number of consecutive time periods before a current time.

In the present embodiment, an executing body of the method for predicting a passenger flow (e.g., the server shown in FIG. 1) may receive a request sent by a terminal for predicting a passenger flow value of a target traffic route in a preset time period by a wired connection or a wireless connection. Then, the executing body may acquire route information of the target traffic route and a passenger flow sequence corresponding to a preset number of consecutive time periods before the current time from a data server storing the route information and the passenger flow value that is in communication connection with the executing body.

In the present embodiment, the traffic route may include, but is not limited to, an airplane route, a train track route, a ship route, a subway route, a car route, or the like. As an example, the target traffic route may be an airplane route from A to B. The route information may include departure place information, destination information, route distance information, route vehicle information of the above route, and the preset time period information. Here, the departure place information may include the population of the departure place, the GDP of the departure place, and the city level information of the departure place. The destination information may include the population of the destination, the GDP of the destination, and the city level information of the destination. The route vehicle information may include trains, high-speed railways, ships, airplanes, or the like. The preset number of consecutive time periods and the passenger flow values of the time periods are in one-to-one correspondence. That is, the passenger flow sequence includes a preset number of passenger flow values, thereby forming the passenger flow sequence. Here, the to-be-predicted time period may be, for example, a certain year, a certain month, a certain week, a certain day, or the like. When the to-be-predicted time period is a certain month, the executing body may acquire the passenger flow value of each month corresponding to a preset number of consecutive months before the current time, thereby forming the passenger flow sequence corresponding to the preset number of consecutive months.

In the present embodiment, each piece of the above route information may represent a feature. A passenger flow prediction model may analyze various information features included in the route information to obtain the passenger flow value based on the analysis result. In order that the passenger flow prediction model can identify the features in the route information more easily, the executing body may also perform segmentation discretization on each type of information in the route information.

Step 202, encoding the route information to generate encoded route information.

In the present embodiment, the executing body may encode the route information by using a one-hot encoding method. Specifically, a register may be set for each feature corresponding to the route information, and each bit in the register represents the value of one data segment of the feature. The following is an example for a specific explanation of the route vehicle, the population of the departure place, and the preset time period.

For vehicle features, a vehicle register may be set. Each bit in the vehicle register may represent a train, a high-speed railway, a ship, or an airplane, respectively. When the travel vehicle is an airplane, the position corresponding to the airplane in the register may be set to 1, and the remaining positions are set to 0.

For the population of the departure place features, a population register may be set. Each bit in the population register may represent a population segment. When it is determined that the population included in the route information belongs to a population segment in the population register, the position in the population register corresponding to the population segment is set to 1, and the remaining positions are set to 0.

For the preset time period information features, the executing body may set a 12-bit register, each bit representing one month; set a 31-bit register, each bit corresponding to one day; and set a 24-bit register, each bit corresponding to one hour. As an example, when the time information corresponding to the preset time period is the passenger flow at 11:00 on November $11^{th}$, the position corresponding to November in the register representing the month may be set to 1, and the remaining positions are set to 0; the position corresponding to the $11^{th}$ day in the register representing the day may be set to 1, and the remaining positions are set to 0; the position corresponding to 11 o'clock in the register representing the hour may be set to 1, and the remaining positions are set to 0. A holiday register may also be set. Each bit in the register corresponds to a holiday. After receiving the preset time period information, it may be determined whether a holiday is included in the preset time period information. When the preset time period information includes a holiday, the position corresponding to the holiday in the holiday register may be set to 1, and the remaining positions are set to 0. By labelling a holiday for the preset time period information, it may provide more features for the passenger flow prediction model, thereby further improving the prediction accuracy of the passenger flow.

Step 203, inputting the encoded route information and the passenger flow sequence into a pre-trained passenger flow prediction model to obtain a passenger flow prediction value of the target traffic route in the preset time period.

In the present embodiment, the executing body may input the encoded route information and the passenger flow sequence into a pre-trained passenger flow prediction model to obtain a passenger flow prediction value of the target traffic route in the preset time period. Here, the passenger flow prediction model may be used to represent a corresponding relationship between both the encoded route information and the passenger flow sequence and the passenger flow prediction value of the target traffic route. The passenger flow prediction model may include a deep neural network (DNN), a recurrent neural network (RNN), a batch normalization (BN), an activation function, and a fully connected layer. The passenger flow prediction value may be obtained after the features outputted by the deep neural network and the features outputted by the recurrent neural network are fully connected in the fully connected layer. Here, the passenger flow prediction value may be a value or a plurality of values. Specifically, when the passenger flow prediction value is a value, it may be all the passenger flow in the predicted preset time period. The preset time period may be divided into a plurality of consecutive sub-periods, for example, in units of days or in units of weeks. When the passenger flow prediction value includes a plurality of values, each passenger flow value may be corresponding to each of the predicted plurality of consecutive time periods.

In some alternative implementations of the present embodiment, the passenger flow prediction model may include a passenger flow prediction sub-model and a long short term memory network. Here, the passenger flow prediction sub-model may be used to predict the passenger flow. The long short term memory network may be used to indicate the deviation of the passenger flow value predicted by the passenger flow prediction sub-model. Here, the executing body may input the encoded route information into the passenger flow prediction sub-model to obtain a first feature value. The first feature value is used to represent a prediction result of the passenger flow value of the target traffic route in the preset time period. Next, the executing body may input the passenger flow sequence into the long short term memory network to obtain a second feature value. The second feature value is used to represent a prediction deviation of the prediction result. Finally, the executing body may input the first feature value and the second feature value into a pre-trained fully connected network to obtain the passenger flow prediction value of the target traffic route in the preset time period.

Specifically, the passenger flow prediction sub-model may be used to represent a corresponding relationship between the encoded route information and the first feature value. The passenger flow prediction sub-model may be a deep neural network. The deep neural network may perform feature extraction on the encoded route information to obtain the first feature value. The long short term memory network (LSTM) is an improvement on the recurrent neural network. The long short term memory network generally includes a plurality of interconnected memory neurons, each of the memory neurons may receive information from the input of the previous memory neuron carrying all or part of the features of other neurons, and then process the information to implement the memory feature. Typically, a time step maybe set for the LSTM, with each time step being one processing cycle. The preset number of consecutive time periods is set according to the time step of the LSTM. For example, when the time step is 3, the preset number of consecutive time periods is 3 consecutive time periods. Therefore, the executing body may acquire the passenger flow sequence corresponding to 3 consecutive time periods. Then, the executing body may input the passenger flow sequence into the LSTM in a time-sharing method. When a first passenger flow value is inputted, the LSTM processes the first passenger flow value to generate a processed output value; then, the LSTM receives a second passenger flow value and superimposes the output value on the received second passenger flow value, and performs feature extraction on the superposed information; it goes on until the data processing of one time step is completed, and the final output is used as the second feature value. After acquiring the first feature value and the second feature value, the executing body may perform feature fusion on the first feature value and the second feature value by using the fully connected network, and finally obtain the passenger flow prediction value of the target traffic route in the preset time period. Here, the fully connected network may be a fully connected layer.

In some alternative implementations of the present embodiment, the passenger flow prediction sub-model may be a combination of a generalized linear model and a deep neural network, namely a Wide & Deep network.

Specifically, the encoded route information may be inputted into the generalized linear model to obtain a first sub-feature value. The generalized linear model may be, for example, a logistic regression model, a Poisson regression model, or the like. The generalized linear model may be used to learn the feature relationship between features in the route information and the encoded time information. Thereby, the memory ability of the passenger flow prediction sub-model may be improved. The encoded route information is inputted into the deep neural network to obtain a second sub-feature value. The deep neural network may be used to deeply learn the feature values in the route information and the encoded time information, so that the generalization ability of the passenger flow prediction sub-model may be improved. Finally, the first sub-feature value and the second sub-feature value may be fused by using the fully connected network to obtain the first feature value. The fully connected network may be a fully connected layer.

Figure 3:
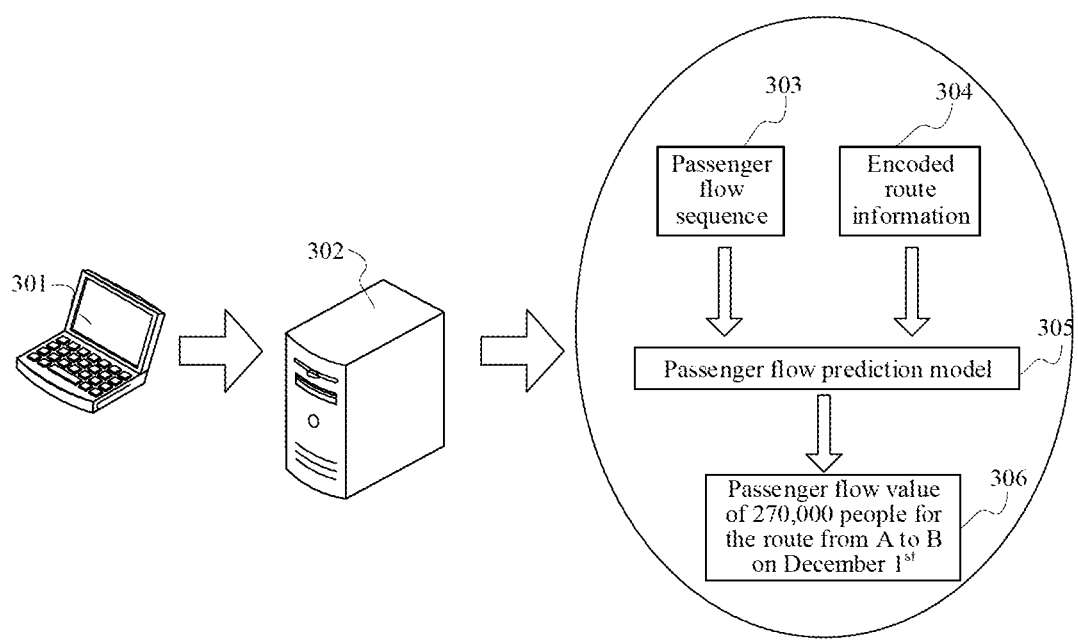
FIG. 3 is a schematic diagram of an application scenario of the method for predicting a passenger flow according to the present disclosure.

With further reference to FIG. 3, FIG. 3 is a schematic diagram of an application scenario of the method for predicting a passenger flow according to the present embodiment. In the application scenario of FIG. 3, a user sends a prediction request for the passenger flow value of the route from A to B on December $1^{st}$ to a server 302 via a computer 301. After receiving the prediction request for the passenger flow value, the server 302 may acquire route information of the route from A to B. Here, the route information includes the population of A, the GDP of A, the city level of A, the population of B, the GDP of B, the city level of B, the distance from A to B, and the preset time information December $1^{st}$. The server 302 may also acquire a passenger flow sequence 303 corresponding to each day from November $25^{th}$ to November $27^{th}$ before the current time November $28^{th}$. The passenger flow sequence is 300,000 people, 270,000 people, and 290,000 people. Next, the server 302 may perform encoding processing on each piece of feature information of the acquired route information to generate encoded route information 304. Finally, the server 302 may input the encoded route information 304 and the passenger flow sequence 303 to a pre-trained passenger flow prediction model 305 to obtain a passenger flow value 306 of 270,000 people for the route from A to B on December $1^{st}$.

The method for predicting a passenger flow provided by the embodiments of the present disclosure, acquires route information of a target traffic route and a passenger flow sequence corresponding to a preset number of consecutive time periods before a to-be-predicted time period, then encodes the route information to generate encoded route information, and inputs the encoded route information and the passenger flow sequence into a pre-trained passenger flow prediction model to obtain a predicted passenger flow value of the target traffic route in the preset time period, so that the predicted passenger flow value is more accurate, and the prediction accuracy of the passenger flow value is improved.

Figure 4:
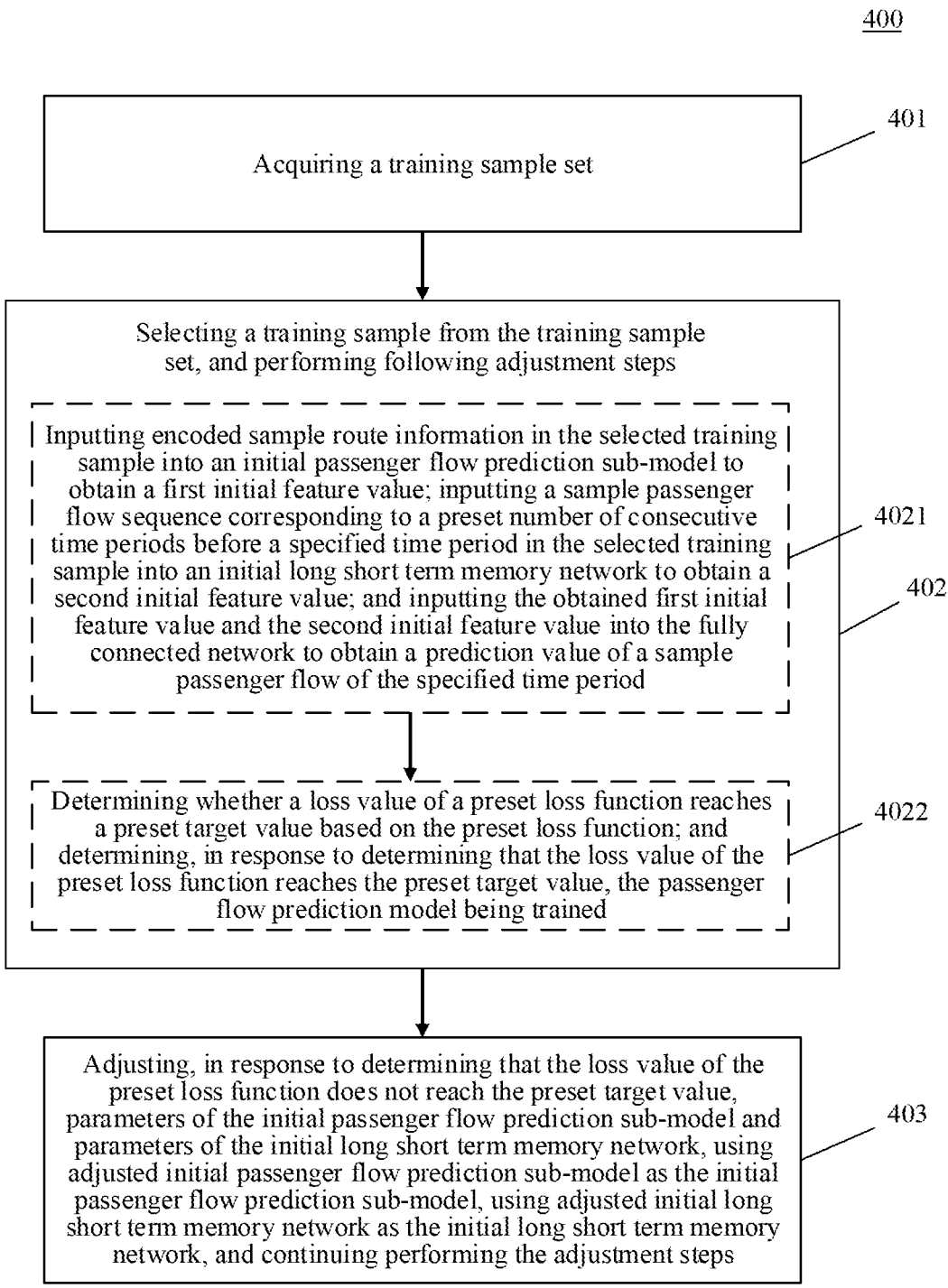
FIG. 4 is a flowchart showing an alternative implementation of a training method for a passenger flow prediction model.

In some alternative implementations of the present embodiment, the passenger flow prediction model may be obtained by training based on a sample set. FIG. 4 shows a flow 400 of an alternative implementation of a training method for the passenger flow prediction model. The flow 400 includes the following steps.

Step 401, acquiring a training sample set. Here, a training sample in the training sample set may include encoded sample route information, a sample passenger flow sequence corresponding to a preset number of consecutive time periods before a specified time period, and a sample passenger flow value of the specified time period. Here, the specific information content of the sample route information may refer to the route information shown in step 201, and detailed description thereof will be omitted.

Step 402, selecting a training sample from the training sample set, and performing following adjustment steps.

First, in step 4021, inputting encoded sample route information in the selected training sample into an initial passenger flow prediction sub-model to obtain a first initial feature value; inputting a sample passenger flow sequence corresponding to a preset number of consecutive time periods before a specified time period in the selected training sample into an initial long short term memory network to obtain a second initial feature value; and inputting the obtained first initial feature value and the second initial feature value into the fully connected network to obtain a prediction value of a sample passenger flow of the specified time period.

Then, in step 4022, determining whether a loss value of a preset loss function reaches a preset target value based on the preset loss function; and determining, in response to determining that the loss value of the preset loss function reaches the preset target value, the passenger flow prediction model being trained. The preset loss function is used to indicate a difference between the prediction value of the sample passenger flow of the specified time period and the sample passenger flow value of the specified time period. The preset loss function may be, for example, a mean square error function. When the value of the preset loss function is no longer reduced, it may be determined that the loss value of the preset loss function reaches the preset target value.

In some alternative implementations of the present embodiment, the training steps further include: step 403, adjusting, in response to determining that the loss value of the preset loss function does not reach the preset target value, parameters of the initial passenger flow prediction sub-model and parameters of the initial long short term memory network, using adjusted initial passenger flow prediction sub-model as the initial passenger flow prediction sub-model, using adjusted initial long short term memory network as the initial long short term memory network, and continuing performing the adjustment steps as shown in step 402.

When the initial passenger flow prediction sub-model is an initial deep neural network, adjusting the parameters of the initial passenger flow prediction sub-model may, for example, includes adjusting the weight of each layer network of the initial deep neural network, or the like. Adjusting the parameters of the initial long short term memory network may, for example, includes adjusting the time step or the number of memory neurons of the initial long short term memory network. It is also possible to adjust the weight of the sample passenger flow prediction value outputted by the initial passenger flow prediction sub-model and the weight of the predicted difference value outputted by the initial long short term memory network.

Based on the training steps of the passenger flow prediction model provided by FIG. 4 to obtain the passenger flow prediction model, the initial passenger flow prediction sub-model and the initial long short term memory network are jointly trained, and the long short term memory network may be used to predict the deviation of the passenger flow value predicted by the passenger flow prediction sub-model, so that the passenger flow may be predicted more accurately.

Figure 5:
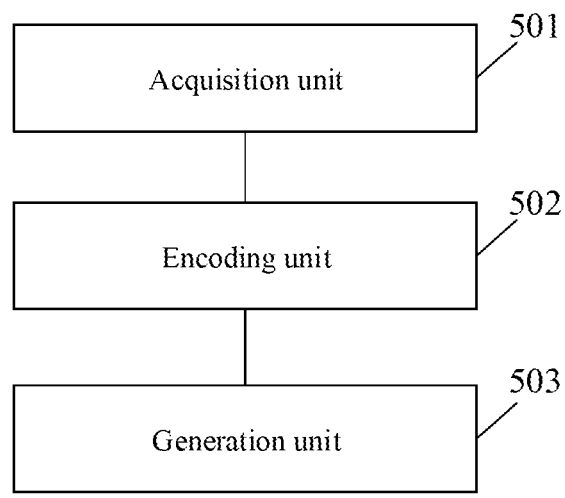
FIG. 5 is a schematic structural diagram of an embodiment of an apparatus for predicting a passenger flow according to the present disclosure.

With further reference to FIG. 5, as an implementation of the method shown in the FIG. 2, the present disclosure provides an embodiment of an apparatus for predicting a passenger flow, and the apparatus embodiment corresponds to the method embodiment as shown in FIG. 2, and the apparatus may be specifically applied to various electronic devices.

As shown in FIG. 5, the apparatus 500 for predicting a passenger flow of the present embodiment may include: an acquisition unit 501, an encoding unit 502 and a generation unit 503. The acquisition unit 501 is configured to acquire, based on a received prediction request for a passenger flow value of a target traffic route in a preset time period, route information of the target traffic route and a passenger flow sequence corresponding to a preset number of consecutive time periods before a current time. The encoding unit 602 is configured to encode the route information to generate encoded route information. The generation unit 603 is configured to input the encoded route information and the passenger flow sequence into a pre-trained passenger flow prediction model to obtain a passenger flow prediction value of the target traffic route in the preset time period, the passenger flow prediction model being used to represent a corresponding relationship between both the encoded route information and the passenger flow sequence and the passenger flow prediction value of the target traffic route.

In the present embodiment, in the apparatus 500 for predicting a passenger flow: the specific processing and the technical effects of the acquisition unit 501, the encoding unit 502 and the generation unit 503 may refer to the related descriptions of the steps 201, 202 and 203 in the corresponding embodiment of FIG. 2, and detailed descriptions thereof will be omitted.

In some alternative implementations of the present embodiment, the passenger flow prediction model includes a passenger flow prediction sub-model and a long short term memory network, and the generation unit 503 includes: a first generation subunit (not shown), configured to input the encoded route information into the passenger flow prediction sub-model to obtain a first feature value, where the first feature value is used to represent a prediction result of the passenger flow value of the target traffic route in the preset time period. A second generation subunit (not shown), is configured to input the passenger flow sequence into the long short term memory network to obtain a second feature value, where the second feature value is used to represent a prediction deviation of the prediction result. A fully connection subunit (not shown), is configured to input the first feature value and the second feature value into a pre-trained fully connected network to obtain the passenger flow prediction value of the target traffic route in the preset time period.

In some alternative implementations of the present embodiment, the passenger flow prediction sub-model includes a generalized linear model and a deep neural network.

In some alternative implementations of the present embodiment, the passenger flow prediction model is obtained by the following training steps: acquiring a training sample set, where a training sample in the training sample set includes encoded sample route information, a sample passenger flow sequence corresponding to a preset number of consecutive time periods before a specified time period, and a sample passenger flow value of the specified time period; and selecting a training sample from the training sample set, and performing the following adjustment steps: inputting the encoded sample route information in the selected training sample into an initial passenger flow prediction sub-model to obtain a first initial feature value; inputting the sample passenger flow sequence corresponding to the preset number of consecutive time periods before the specified time period in the selected training sample into an initial long short term memory network to obtain a second initial feature value; inputting the obtained first initial feature value and the second initial feature value into the fully connected network to obtain a prediction value of a sample passenger flow of the specified time period; determining whether a loss value of a preset loss function reaches a preset target value based on the preset loss function; and determining, in response to determining that the loss value of the preset loss function reaches the preset target value, the passenger flow prediction model is trained, where the preset loss function is used to indicate a difference between the prediction value of the sample passenger flow of the specified time period and the sample passenger flow value of the specified time period.

In some alternative implementations of the present embodiment, the training steps of the passenger flow prediction model further include: adjusting, in response to determining that the loss value of the preset loss function does not reach the preset target value, parameters of the initial passenger flow prediction sub-model and parameters of the initial long short term memory network, using adjusted initial passenger flow prediction sub-model as the initial passenger flow prediction sub-model, using adjusted initial long short term memory network as the initial long short term memory network, and continuing performing the adjustment steps.

Figure 6:
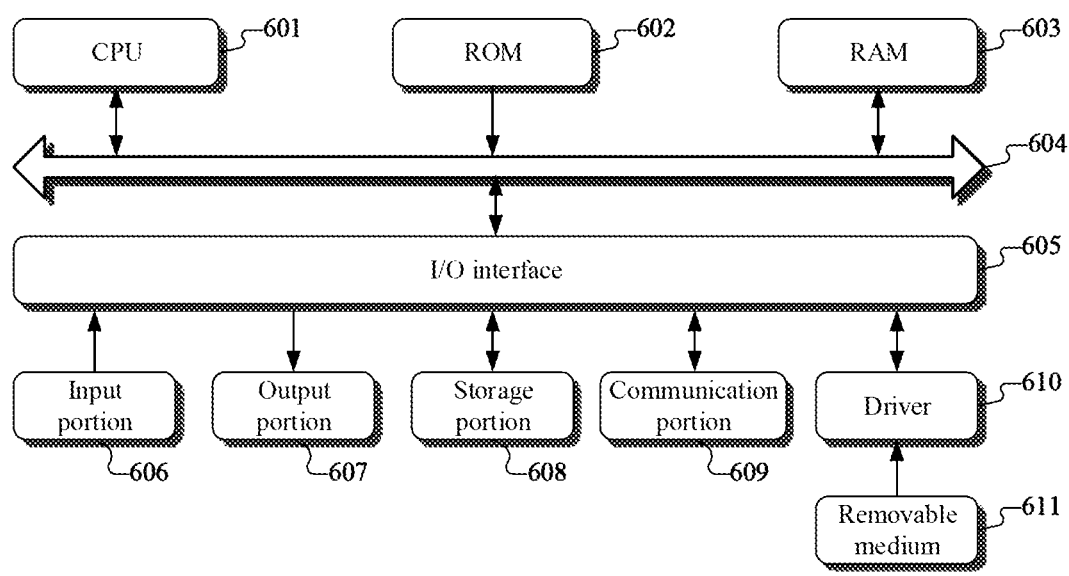
FIG. 6 is a schematic structural diagram of a computer system adapted to implement a server of the embodiments of the present disclosure.

With further reference to FIG. 6, a schematic structural diagram of a computer system 600 adapted to implement an electronic device (for example, the server as shown in FIG. 1) of the embodiments of the present disclosure is shown. The electronic device shown in FIG. 6 is merely an example, and should not impose any limitation on the function and scope of use of the embodiments of the present disclosure.

As shown in FIG. 6, the computer system 600 includes a central processing unit (CPU) 601, which may execute various appropriate actions and processes in accordance with a program stored in a read-only memory (ROM) 602 or a program loaded into a random access memory (RAM) 603 from a storage portion 608. The RAM 603 also stores various programs and data required by operations of the system 600. The CPU 601, the ROM 602 and the RAM 603 are connected to each other through a bus 604. An input/output (I/O) interface 605 is also connected to the bus 604.

The following components are connected to the I/O interface 605: an input portion 606 including a keyboard, a mouse, etc.; an output portion 607 including such as a cathode ray tube (CRT), a liquid crystal display device (LCD), a speaker, etc.; a storage portion 608 including a hard disk or the like; and a communication portion 609 including a network interface card, such as a LAN card and a modem. The communication portion 609 performs communication processes via a network, such as the Internet. A driver 610 is also connected to the I/O interface 605 as required. A removable medium 611, such as a magnetic disk, an optical disk, a magneto-optical disk, and a semiconductor memory, may be installed on the driver 610, to facilitate the retrieval of a computer program from the removable medium 611, and the installation thereof on the storage portion 608 as needed.

In particular, according to the embodiments of the present disclosure, the process described above with reference to the flow chart may be implemented in a computer software program. For example, an embodiment of the present disclosure includes a computer program product, which includes a computer program that is tangibly embedded in a computer-readable medium. The computer program includes program codes for performing the method as illustrated in the flow chart. In such an embodiment, the computer program may be downloaded and installed from a network via the communication portion 609, and/or may be installed from the removable medium 611. The computer program, when executed by the central processing unit (CPU) 601, implements the above mentioned functionalities as defined by the method of the present disclosure. It should be noted that the computer readable medium in the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination of any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fiber, a portable compact disk read only memory (CD-ROM), an optical memory, a magnet memory or any suitable combination of the above. In the present disclosure, the computer readable storage medium may be any physical medium containing or storing programs which may be used by a command execution system, apparatus or element or incorporated thereto. In the present disclosure, the computer readable signal medium may include data signal in the base band or propagating as parts of a carrier, in which computer readable program codes are carried. The propagating data signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

A computer program code for performing operations in the present disclosure may be compiled using one or more programming languages or combinations thereof. The programming languages include object-oriented programming languages, such as Java, Smalltalk or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or server. In the circumstance involving a remote computer, the remote computer may be connected to a user's computer through any network, including local area network (LAN) or wide area network (WAN), or may be connected to an external computer (for example, connected through Internet using an Internet service provider).

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion including one or more executable instructions for implementing specified logic functions. It should also be noted that, in some alternative implementations, the functions denoted by the blocks may occur in a sequence different from the sequences shown in the accompanying drawings. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system performing specified functions or operations, or by a combination of a dedicated hardware and computer instructions.

The units involved in the embodiments of the present disclosure may be implemented by means of software or hardware. The described units may also be provided in a processor, for example, maybe described as: a processor including an acquisition unit, an encoding unit and a generation unit. Here, the names of these units do not in some cases constitute limitations to such units themselves. For example, the acquisition unit may also be described as "a unit for acquiring, based on a received prediction request for a passenger flow value of a target traffic route in a preset time period, route information of the target traffic route and a passenger flow sequence corresponding to a preset number of consecutive time periods before a current time."

In another aspect, the present disclosure further provides a computer readable medium. The computer readable medium may be included in the electronic device in the above described embodiments, or a stand-alone computer readable medium not assembled into the electronic device. The computer readable medium stores one or more programs. The one or more programs, when executed by the electronic device, cause the electronic device to: acquire, based on a received prediction request for a passenger flow value of a target traffic route in a preset time period, route information of the target traffic route and a passenger flow sequence corresponding to a preset number of consecutive time periods before a current time; encode the route information to generate encoded route information; and input the encoded route information and the passenger flow sequence into a pre-trained passenger flow prediction model to obtain a passenger flow prediction value of the target traffic route in the preset time period, the passenger flow prediction model being used to represent a corresponding relationship between both the encoded route information and the passenger flow sequence and the passenger flow prediction value of the target traffic route.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the present disclosure. Technical schemes formed by the above-described features being interchanged with, but not limited to, technical features with similar functions disclosed in the present disclosure are examples.

What is claimed is:

1. A method for predicting a passenger flow, the method comprising:

acquiring, based on a received prediction request for a passenger flow value of a target traffic route in a preset time period, route information of the target traffic route and a passenger flow sequence corresponding to a preset number of consecutive time periods before a current time;

encoding the route information to generate encoded route information; and inputting the encoded route information and the passenger flow sequence into a pre-trained passenger flow prediction model to obtain a passenger flow prediction value of the target traffic route in the preset time period, the passenger flow prediction model being used to represent a corresponding relationship between both the encoded route information and the passenger flow sequence and the passenger flow prediction value of the target traffic route, wherein the passenger flow prediction model comprises a passenger flow prediction sub-model and a long short term memory network, and wherein the inputting of the encoded route information and the passenger flow sequence into the pre-trained passenger flow prediction model to obtain the passenger flow prediction value of the target traffic route in the preset time period, comprises:

inputting the encoded route information into the passenger flow prediction sub-model to obtain a first feature value, wherein the first feature value is used to represent a prediction result of the passenger flow value of the target traffic route in the preset time period;

inputting the passenger flow sequence into the long short term memory network to obtain a second feature value, wherein the second feature value is used to represent a prediction deviation of the prediction result; and inputting the first feature value and the second feature value into a pre-trained fully connected network to obtain the passenger flow prediction value of the target traffic route in the preset time period.

2. The method according to claim 1, wherein the passenger flow prediction sub-model comprises a generalized linear model and a deep neural network.

3. The method according to claim 1, wherein the passenger flow prediction model is obtained by following training steps:

acquiring a training sample set, wherein a training sample in the training sample set comprises encoded sample route information, a sample passenger flow sequence corresponding to a preset number of consecutive time periods before a specified time period, and a sample passenger flow value of the specified time period; and selecting a training sample from the training sample set, and performing following adjustment steps: inputting the encoded sample route information in the selected training sample into an initial passenger flow prediction sub-model to obtain a first initial feature value; inputting the sample passenger flow sequence corresponding to the preset number of consecutive time periods before the specified time period in the selected training sample into an initial long short term memory network to obtain a second initial feature value; inputting the obtained first initial feature value and the second initial feature value into a fully connected network to obtain a prediction value of a sample passenger flow of the specified time period; determining whether a loss value of a preset loss function reaches a preset target value based on the preset loss function;

and determining, in response to determining that the loss value of the preset loss function reaches the preset target value, the passenger flow prediction model being trained, wherein the preset loss function is used to indicate a difference between the prediction value of the sample passenger flow of the specified time period and the sample passenger flow value of the specified time period.

4. The method according to claim 3, wherein the training steps of the passenger flow prediction model further comprise:

adjusting, in response to determining that the loss value of the preset loss function does not reach the preset target value, parameters of the initial passenger flow prediction sub-model and parameters of the initial long short term memory network, using adjusted initial passenger flow prediction sub-model as the initial passenger flow prediction sub-model, using adjusted initial long short term memory network as the initial long short term memory network, and continuing performing the adjustment steps.

5. An apparatus for predicting a passenger flow, the apparatus comprising:

at least one processor; and a memory storing instructions, the instructions when executed by the at least one processor, cause the at least one processor to perform operations, the operations comprising:

acquiring, based on a received prediction request for a passenger flow value of a target traffic route in a preset time period, route information of the target traffic route and a passenger flow sequence corresponding to a preset number of consecutive time periods before a current time;

encoding the route information to generate encoded route information; and inputting the encoded route information and the passenger flow sequence into a pre-trained passenger flow prediction model to obtain a passenger flow prediction value of the target traffic route in the preset time period, the passenger flow prediction model being used to represent a corresponding relationship between both the encoded route information and the passenger flow sequence and the passenger flow prediction value of the target traffic route, wherein the passenger flow prediction model comprises a passenger flow prediction sub-model and a long short term memory network, and wherein the inputting of the encoded route information and the passenger flow sequence into the pre-trained passenger flow prediction model to obtain the passenger flow prediction value of the target traffic route in the preset time period, comprises:

inputting the encoded route information into the passenger flow prediction sub-model to obtain a first feature value, wherein the first feature value is used to represent a prediction result of the passenger flow value of the target traffic route in the preset time period;

inputting the passenger flow sequence into the long short term memory network to obtain a second feature value, wherein the second feature value is used to represent a prediction deviation of the prediction result; and inputting the first feature value and the second feature value into a pre- trained fully connected network to obtain the passenger flow prediction value of the target traffic route in the preset time period.

6. The apparatus according to claim 5, wherein the passenger flow prediction sub-model comprises a generalized linear model and a deep neural network.

7. The apparatus according to claim 5, wherein the passenger flow prediction model is obtained by following training steps:

acquiring a training sample set, wherein a training sample in the training sample set comprises encoded sample route information, a sample passenger flow sequence corresponding to a preset number of consecutive time periods before a specified time period, and a sample passenger flow value of the specified time period; and selecting a training sample from the training sample set, and performing following adjustment steps: inputting the encoded sample route information in the selected training sample into an initial passenger flow prediction sub-model to obtain a first initial feature value; inputting the sample passenger flow sequence corresponding to the preset number of consecutive time periods before the specified time period in the selected training sample into an initial long short term memory network to obtain a second initial feature value; inputting the obtained first initial feature value and the second initial feature value into a fully connected network to obtain a prediction value of a sample passenger flow of the specified time period; determining whether a loss value of a preset loss function reaches a preset target value based on the preset loss function;

and determining, in response to determining that the loss value of the preset loss function reaches the preset target value, the passenger flow prediction model is trained, wherein the preset loss function is used to indicate a difference between the prediction value of the sample passenger flow of the specified time period and the sample passenger flow value of the specified time period.

8. The apparatus according to claim 7, wherein the training steps of the passenger flow prediction model further comprise:

adjusting, in response to determining that the loss value of the preset loss function does not reach the preset target value, parameters of the initial passenger flow prediction sub-model and parameters of the initial long short term memory network, using adjusted initial passenger flow prediction sub-model as the initial passenger flow prediction sub-model, using adjusted initial long short term memory network as the initial long short term memory network, and continuing performing the adjustment steps.

9. A non-transitory computer readable medium, storing a computer program thereon, the computer program, when executed by a processor, causes the processor to perform operations, the operations comprising:

acquiring, based on a received prediction request for a passenger flow value of a target traffic route in a preset time period, route information of the target traffic route and a passenger flow sequence corresponding to a preset number of consecutive time periods before a current time;

encoding the route information to generate encoded route information; and inputting the encoded route information and the passenger flow sequence into a pre-trained passenger flow prediction model to obtain a passenger flow prediction value of the target traffic route in the preset time period, the passenger flow prediction model being used to represent a corresponding relationship between both the encoded route information and the passenger flow sequence and the passenger flow prediction value of the target traffic route, wherein the passenger flow prediction model comprises a passenger flow prediction sub-model and a long short term memory network, and wherein the inputting of the encoded route information and the passenger flow sequence into the pre-trained passenger flow prediction model to obtain the passenger flow prediction value of the target traffic route in the preset time period, comprises:

inputting the encoded route information into the passenger flow prediction sub-model to obtain a first feature value, wherein the first feature value is used to represent a prediction result of the passenger flow value of the target traffic route in the preset time period;

inputting the passenger flow sequence into the long short term memory network to obtain a second feature value, wherein the second feature value is used to represent a prediction deviation of the prediction result; and inputting the first feature value and the second feature value into a pre-trained fully connected network to obtain the passenger flow prediction value of the target traffic route in the preset time period.

* * * * *